*INVENTOR.*
GLENN R. MARIN
BY

United States Patent Office 3,378,622
Patented Apr. 16, 1968

3,378,622
METHOD OF JOINING ELECTRODE BODIES OF DISSIMILAR THERMAL COEFFICIENTS OF EXPANSION
Glenn R. Marin, North Tonawanda, N.Y., assignor to The Carborundum Company, Niagara Falls, N.Y., a corporation of Delaware
Filed June 15, 1967, Ser. No. 646,343
11 Claims. (Cl. 13—18)

ABSTRACT OF THE DISCLOSURE

A mechanical joint between two bodies of different coefficients of thermal expansion which remains tight even though the bodies expand and contract at different rates. A first body of lower coefficient of thermal expansion is provided on the face to be joined with a recessed area having a groove in the side wall thereof. A second body of higher coefficient of thermal expansion is provided on the face to be joined with an extension carrying a lip. When joined the extension and lip of the second body is contained in the recessed area and groove of the first body thereby locking the bodies together. The joint is formed at high temperatures and as the joined bodies cool, the extension of the second body carrying the lip contracts longitudinally at a greater rate than the walls of the recessed area of the first body. The lip bears against the groove and as the extension longitudinally contracts the face of the first body is drawn against the face of the second body.

---

This invention relates to the bonding of two bodies of dissimilar coefficients of expansion and to composite articles formed thereby. More particularly this invention relates to a method of bonding corrosion resistant articles formed from materials of differing coefficients of thermal expansion wherein at least a portion of said articles comprises a refractory material.

The application of refractory materials such as borides and carbides in various industrial processes is becoming more and more prevalent. For example, in the reduction of alumina to aluminum, titanium diboride has found use as an electrode material because of its ability to withstand high temperatures and its resistance to molten aluminum and cryolite. Other refractory materials such as zirconium diboride and titanium carbide exhibit similar properties. Such refractory materials, because of their ability to withstand high temperatures, can also be fabricated into thermocouple protection tubes and the like.

The chief disadvantage of the use of refractory materials in industrial applications of the type set forth above lies in the high cost of the materials themselves and the high fabrication costs. Accordingly, in order to reduce the cost of articles such as electrodes and thermocouple protection tubes designed for use in high temperature and highly corrosive environments, only that portion of the article actually in or adjacent to such environments need be a refractory material. The remaining portion of the article may be produced from a less expensive or more easily fabricated material. Thus, an electrode may consist of a carbon or graphite member and a tip of refractory material for insertion in a molten alumina bath. The bonding of the refractory tip to the carbon or graphite member presents great problems due to the difference in thermal coefficient of expansion between the refractory material and the carbon or graphite member. Titanium diboride, for example, has a coefficient of thermal expansion of between about $5.0 \times 10^{-6}$ to about $6.0 \times 10^{-6}$ per degree C. while graphite has a coefficient of thermal expansion of about $1.0 \times 10^{-6}$ per degree C. Therefore, in a composite article having members of differing coefficients of expansion directly bonded to each other, such as by welding or bonding the members together with refractory cements and the like, the expansion and contraction of the article upon heating and cooling produces undesirable stresses in the article due to the differential expansion and contraction of the members. Such stresses may result in cracking of one or both members of the composite article or in failure of the bond between the members.

It is therefore an object of this invention to provide articles comprising members of differing thermal coefficients of expansion.

It is a further object of this invention to provide a joint between bodies having different thermal coefficients of expansion which is substantially unaffected by temperature changes.

It is another object of this invention to provide an article suitable for use as an electrode in an electrolytic cell or as a thermocouple protection tube wherein said article is provided with a refractory end or tip.

These and other objects and advantages of the invention will be apparent from the detailed description given hereinafter and from the drawings in which.

It has been found that the above objects may be achieved by providing a mechanical bond between a member having a higher coefficient of thermal expansion and another member having a lower coefficient of thermal expansion whereby a strong tight joint is maintained between the members which is substantially unaffected by temperature changes and differences in coefficients of expansion between the members.

More particularly the mechanical bond between the members of composite articles made according to this invention is provided by adapting the abutting faces of the members in the following manner. The abutting face of one member having the higher coefficient of thermal expansion is provided with an extension, said extension being provided with lip intermediate the base and end thereof. The other member is provided with a recess for receiving the extension of the first member, the wall of said recess having a groove therein. When assembled, the extension on one member is located in the recess of the other member with the lip of the extension disposed in the groove of the recess wall thereby locking the members together. As will be explained below, the joint is formed at relatively high temperatures and is tight at high temperatures. As the members cool the longitudinal contraction of the extension on the member having the higher coefficient of thermal expansion acts to draw the abutting faces of the members together and maintains a tight bond between the members.

Figure 1:
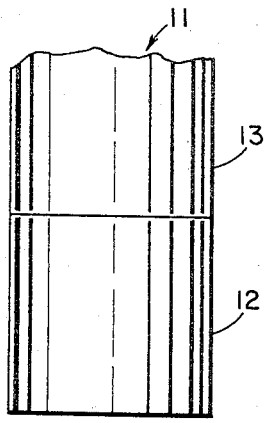
FIGURE 1 is a side view of a portion of an electrode made according to this invention showing the tip and a portion of the body end joined thereto.

Although this invention may be used in many applications where it is desired to mechanically join together members of differing coefficients of thermal expansion in a bond which is substantially unaffected by expansion and contraction of the members, it is particularly useful in joining a refractory member and a graphite member to form a composite electrode for use in refining aluminum. Referring to FIGURE 1, a composite electrode, shown generally as 11, comprises a refractory tip 12 and a graphite body 13.

Figure 2:
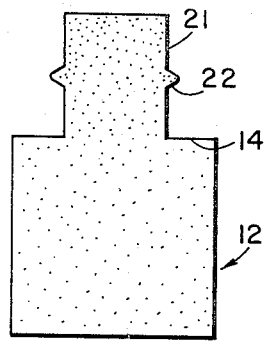
FIGURE 2 is a side cross-sectional view of the electrode tip of FIGURE 1.

Referring to FIGURE 2, tip 12 comprises a refractory material such as titanium diboride, and is adapted for joining with graphite body 13 by extension 21 on face 14. Lip 22 is provided on extension 21 at a point removed from face 14.

Figure 3:
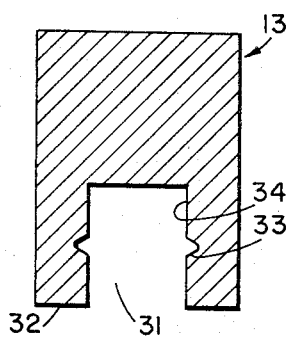
FIGURE 3 is a side cross-sectional view of a portion of the body adjacent the tip of the article shown in FIGURE 1.

Referring to FIGURE 3, graphite body 13 is adapted for joining with tip 12 by recessed area 31 in face 32 of body 13. Area 31 is of substantially the same configuration and dimension as extension 21 of tip 12 so as to be adapted for receiving said extension. Groove 33 is provided in side wall 34 of recessed area 31 for receiving lip 22 of extension 21, said groove being spaced apart from face 32 of body 13 a distance equal to the distance between lip 22 and face 14 of tip 12.

Figure 4:
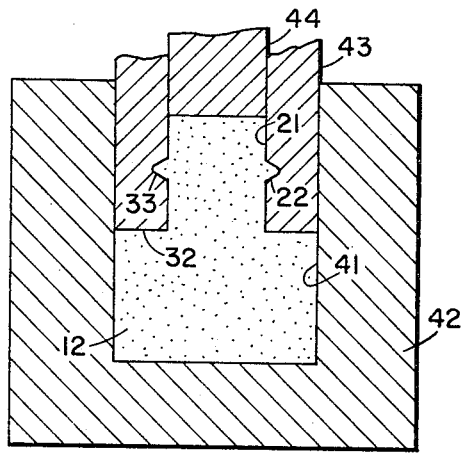
FIGURE 4 is a side cross-sectional view of a mold showing the manner in which articles are produced according to this invention.

Referring to FIGURE 4, particulate ceramic material is placed in cavity 41 of a mold designated generally as 42 and compacted so as to eliminate voids between the particles. A graphite tube plunger 43 of substantially the same diameter as mold cavity 41 is inserted therein so that one end of said tube contacts said ceramic material. The inserted tube end is provided with face 32 and groove 33 located in the bore of tube 43 a predetermined distance from face 32. An additional amount of ceramic material, preferably the same composition as that already in mold cavity 41, is placed in the bore of tube 43 in sufficient quantity to completely cover groove 33. A solid graphite plunger 44 of substantially the same diameter as the bore of tube 43 is inserted in the bore of tube 43. Both tube 43 and solid plunger 44 are attached to suitable means, not shown, for exerting compressive force on the ceramic material contained in the mold cavity 41 and the bore of tube 43. The mold is heated by means not shown such as an induction coil. The ceramic material is subjected to the simultaneous application of heat and pressure thereby to produce tip 112 and extension 21. During pressing, ceramic material is forced into groove 33 thereby producing lip 22 on extension 21 within groove 33 and locking tip 12 to tube 43.

Immediately after hot pressing, tip 12 and plunger 43 are firmly and tightly attached to each other. As these members cool they contract both radially and longitudinally. Since the coefficient of thermal expansion of tip 12 is greater than that of graphite tube plunger 43, the area between lip 22 and face 14 decreases more than the area between groove 33 and face 32. Lip 22 bears against groove 33 and draws face 32 of tube 43 tightly against face 14 of tip 12 and maintains a tight joint between tip 12 and tube 43, event at room temperature.

The finished electrode comprises a graphite body consisting of tube 43 and plunger 44 and tip 12 joined on one end thereof. If desired, plunger 44 can be removed and the bore of tube 43 utilized for the passage of coolant fluids or for containing electrical connections or a thermocouple.

The location of the groove and lip relative to the abutting faces of the members of composite articles made according to this invention depends on the strength of the materials to be joined and on the coefficients of expansion of the materials; however, improper location may cause overstressing and cracking of the members. For best results it has been found that the distance between the groove and lip and the abutting faces of the members to be joined should be substantially equal to the radius of the extension. In this manner radial contraction will be offset by longitudinal contraction and a tight joint maintained without unduly overstressing either member.

Although in the embodiment of this invention described above the ceramic tip is joined to a graphite body, it should be clear that the body may consist of any material which has a lower coefficient of thermal expansion than the ceramic tip and which has sufficient compressive strength to allow its use as a plunger for forming the tip and as a mold for forming the extension.

Figure 5:
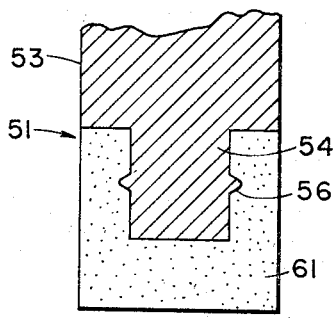
FIGURE 5 is a side cross-sectional view of another embodiment of this invention.

Another embodiment of this invention is shown in FIGURE 5 wherein composite electrode 51 comprises body 53 and tip 61. Body 53 is provided with extension 54 and lip 56. In this case body 53 is formed from a material having a higher coefficient of thermal expansion than tip 61 and sufficient compressive strength so that body 53 can act as a plunger in hot pressing tip 61.

The following example illustrates the production of an electrode comprising a graphite body and a ceramic tip joined thereto in accordance with this invention.

*Example*

An electrode having a graphite body and a two inch titanium diboride tip joined to one end of the graphite body was made in the following manner. Approximately 95 grams of finely divided (−325 mesh) titanium diboride powder was placed in a graphite mold having a cavity 1 inch in diameter and was tamped to achieve uniform distribution of the powder in the mold cavity. A graphite tube having an outside diameter of 1 inch, a bore diameter of ½ inch and a length of 6 inches was inserted in the mold cavity, and run down against the titanium diboride powder. The inserted tube end was provided with a face and a groove in the bore ¼ inch from the face. An additional 9.5 grams of the finely divided titanium diboride powder was placed in the graphite tube so as to completely cover the groove and a solid graphite rod having an outside diameter of ½ inch and a length of 5½ inches was inserted in the graphite tube. The titanium diboride was hot pressed at a temperature of about 2050° C. to about 2100° C. for 30 minutes. Pressure was applied to the titanium diboride through the graphite tube and solid graphite plunger by means of a hydraulic press. Pressure on the center plunger reached a maximum of 5000 p.s.i. until the top of the center plunger was flush with the top of the graphite tube at which point the pressure dropped to 3000 p.s.i. on both the center plunger and graphite tube.

At completion of the hot pressing operation the mold was allowed to cool and the composite electrode was removed. It was noted that even at room temperature there was a strong tight bond between the titanium diboride tip and the graphite tube. No cracking could be observed and there was no evidence of any reaction between the titanium diboride and the graphite. The density of the titanium diboride tip was at least 95% of theoretical.

The joint between the graphite tube and the titanium diboride tip remains tight at temperatures ranging from ambient up to about 2000° C., the forming temperature of the tip. The fit between the graphite tube and graphite plunger contained therein is sufficiently tight to insure that the plunger remains in place in the tube. If desired, however, the solid plunger can be removed from the tube by machining.

Although in the example the ceramic tip was formed using a double action plunger, i.e., a graphite tube and solid graphite rod, it should be clear that a single, solid plunger provided with a recessed area and groove in the manner already described can also be used.

It will be understood that the present invention is not limited to the specific materials and other specific details described above and may be carried out with various modifications without departing from the scope of the invention as defined in the appended claims.

I claim:

1. A method for joining two bodies of different thermal coefficients of expansion wherein at least one of said bodies is a ceramic to form an article having a joint which is substantially unaffected by changes in temperature which comprises providing on a face of a body of higher coefficient of thermal expansion an extension, said extension having a lip in spaced relationship to said face, and providing on a face of a second body of lower coefficient of thermal expansion a recessed area for containing said extension, said recessed area being provided with a groove for containing said lip so that as said bodies are assembled and heated, after which on cooling said extension contracts and causes said lip to bear against said groove drawing said faces of said bodies into close abutting relationship.

2. The method as defined in claim 1 wherein a first body is formed by the simultaneous application of heat and pressure and a second body is the means for exerting pressure on said first body whereby said first body is simultaneously formed and joined to said second body.

3. The method as defined in claim 2 wherein said first body comprises a material of higher thermal coefficient of expansion than said second body, said second body being provided on a face adjacent said first body with a recessed area and a groove in said recessed area side wall, said groove being in spaced relationship to said face, said material of said first body being contained in a heated pressure resisting means and said second body exerting pressure on said material while said material is heated to form said material into said first body, said extension being formed within and contained by said recessed area of said second body and said lip of said extension being formed in and contained by said groove of said recessed area of said second body.

4. The method as defined in claim 2 wherein said first body comprises a material of lower coefficient of thermal expansion than said second body, said second body being provided on a face adjacent said first body with an extension and a lip on said extension in spaced relationship to said face, said material of said first body being contained in heated pressure resisting means and said second body exerting pressure on said material while said material is heated, thereby to form said material into said first body, said recessed area and groove of said first body being formed around and containing said extension and lip of said second body.

5. The method as defined in claim 3 wherein said first body is a ceramic material and said second body is graphite.

6. The method as defined in claim 3 wherein said first body is titanium diboride.

7. The method as defined in claim 3 wherein said second body comprises a graphite tube provided on one end with a face and a solid graphite rod in the bore of said tube, one end of said rod being spaced inwardly from said face of said tube, said recessed area in said graphite body for forming and containing said extension of said first body being defined by said inwardly spaced end of said graphite rod and said graphite tube bore.

8. The method as defined in claim 7 wherein a groove is located in the bore of said tube adjacent said face thereof a distance substantially equivalent to the radius of the bore of said tube.

9. The method as defined in claim 7 wherein said first body is formed at a temperature of about 2075° C. and a pressure of at least about 3000 p.s.i., said pressure being exerted by means of said graphite tube and said graphite rod.

10. An article suitable for use as an electrode in aluminum refining which comprises an elongated graphite body and a ceramic tip, said tip being provided on one face thereof with an extension carrying a lip in spaced relationship to said face, said body being provided on one face thereof with a recessed area for containing said extension and a groove in the side wall thereof for containing said lip, said recessed area and groove containing said extension and lip thereby to provide a tight joint between said body and said tip, said joint being unaffected by temperature up to the forming temperature of said tip.

11. The article as defined in claim 10 wherein said tip is titanium diboride.

References Cited
UNITED STATES PATENTS

| | | | |
|---|---|---|---|
| 2,862,828 | 12/1958 | Glaser | 106—56 |
| 3,160,780 | 12/1964 | Coppola | 29—630 |
| 3,198,932 | 8/1965 | Weatherly | 219—145 |
| 3,311,966 | 4/1967 | Shaheen et al. | 29—625 |
| 3,346,951 | 12/1962 | Gwyn | 29—630 |
| 1,723,582 | 8/1929 | Sem | 13—18 X |
| 2,952,573 | 9/1960 | Torti | 219—146 X |

BERNARD A. GILHEANY, *Primary Examiner.*

H. B. GILSON, *Assistant Examiner.*